(12) United States Patent
Khalil et al.

(10) Patent No.: US 9,575,194 B2
(45) Date of Patent: Feb. 21, 2017

(54) METHOD APPARATUS AND SYSTEM FOR MIGRATION NOISE ATTENUATION AND IMAGE ENHANCEMENT

(71) Applicant: CGG Services SA, Massy (FR)

(72) Inventors: Adel Khalil, Aberdeen (GB); James Sun, Singapore (SG); Yu Zhang, Crawley (GB); Gordon Poole, Grinstead (GB)

(73) Assignee: CGG SERVICES SAS, Massy (FR)

( * ) Notice: Subject to any disclaimer, the term of this patent is extended or adjusted under 35 U.S.C. 154(b) by 273 days.

(21) Appl. No.: 14/278,039

(22) Filed: May 15, 2014

(65) Prior Publication Data

US 2014/0328140 A1 Nov. 6, 2014

Related U.S. Application Data

(60) Provisional application No. 61/818,003, filed on May 1, 2013.

(51) Int. Cl.
*G01V 1/28* (2006.01)

(52) U.S. Cl.
CPC ........... *G01V 1/282* (2013.01); *G01V 2210/51* (2013.01); *G01V 2210/679* (2013.01)

(58) Field of Classification Search
CPC ............... G01V 1/282; G01V 2210/51; G01V 2210/679
(Continued)

(56) References Cited

U.S. PATENT DOCUMENTS 5,596,547 A 1/1997 Bancroft et al.
6,889,142 B2 5/2005 Schonewille
(Continued)

FOREIGN PATENT DOCUMENTS

| CN | 103091710 A | 5/2013 |
|---|---|---|
| CN | 102353988 B | 7/2013 |
| WO | 2013134145 A1 | 9/2013 |

OTHER PUBLICATIONS

Sava, P. et al., "Angle-domain common-image gathers by wavefield continuation methods", Geophysics, vol. 68 No. 3, May-Jun. 2003, pp. 1065-1074.
(Continued)

*Primary Examiner* — Daniel L Murphy
(74) *Attorney, Agent, or Firm* — Patent Portfolio Builders PLLC (57) ABSTRACT

A method for processing seismic data includes receiving seismic data and a velocity model (c(x)) for a plurality of locations (x), scaling a dimension of the seismic data according to the velocity model (c(x)) to provide a velocity normalized seismic data, and generating a final image (S(x)) of the subsurface using the velocity normalized seismic data. The velocity normalized seismic data may be a reverse-time migration image (I(x,ξ)) corresponding to the plurality of locations (x) and a plurality of propagation distance offsets (ξ). The method may also include transforming the reverse-time migration image (I(x,ξ)) for the plurality of selected positions (x) to a wavenumber domain to provide velocity normalized wavenumber data (I(k,ψ)) and suppressing data components corresponding to non-physical or undefined reflection angles to provide enhanced wavenumber data (I'(k,ψ)) and using the enhanced wavenumber data (I'(k,ψ)) to generate the final image (S(x)). A corresponding apparatus is also disclosed herein.

20 Claims, 9 Drawing Sheets (58) Field of Classification Search
USPC .......................................................... 367/50
See application file for complete search history.

(56) References Cited

U.S. PATENT DOCUMENTS

| | | | | |
|---|---|---|---|---|
| 7,196,969 | B1* | 3/2007 | Karazincir | G01V 1/28 367/50 |
| 7,286,690 | B2* | 10/2007 | Kelly | G01V 1/28 382/109 |
| 8,588,028 | B2 | 11/2013 | Nichols et al. | |
| 8,902,709 | B2* | 12/2014 | Jaiswal | G01V 1/301 367/73 |
| 9,244,181 | B2* | 1/2016 | Rickett | G01V 1/282 |
| 2010/0074051 | A1* | 3/2010 | Halliday | G01V 1/28 367/43 |
| 2012/0051176 | A1 | 3/2012 | Liu | |

OTHER PUBLICATIONS

Baysal, E. et al., "Reverse time migration:" Geophysics, vol. 48, No. 11 Nov. 1983, pp. 1514-1524.

Kaelin, B et al., "Eliminating artifacts in RMT using pre-stack gathers", 81st Annual International Meeting, SEG, Expanded Abstracts, 2011, pp. 3125-3129.

Liu, F. et al., "An effective imaging condition for reverse-time-migration using wave-field decomposition", Geophysics, vol. 76, No. 1, Jan.-Feb. 2011, pp. S29-S39.

Vyas, M., et al., "Angle gathers for RTM using extended imaging conditions", 80th Annual International Meeting, SEG, Expanded Abstracts, 2010, pp. 3252-3256.

Whitmore, N.D., "Iterative depth migration by backward time propagation", : 53rd Annual International Meeting, SEG, Expanded Abstracts, 1983, pp. 382-385.

Yoon, K. et al., "Challenges in reverse-time migration", 74th Annual International Meeting, SEG, Expanded Abstracts, Oct. 10-15, 2004.

Zhang H. et al., "Removing S-wave noise in TTI reverse time migration", 79th Annual International Meeting, SEG, Expanded Abstracts, 2009.

Zhang Y. et al., "Practical issues of reverse time migration: true-amplitude gather, noise removal and harmonic-source encoding:", 70th Annual Conference and Exhibition, EAGE, vol. 26, Jan. 2009, pp. 29-35.

Sava P., et al., "Time-shift imaging condition in seismic migration", Geophysics, vol. 71, No. 6, Nov.-Dec. 2006, pp. S209-S217.

McMechan, "Migration by Extrapolation of Time-Dependent Boundary Values," Geophysical Prospecting, Jun. 1983, pp. 413-420, vol. 31, No. 3.

Khalil et al., "RTM noise attenuation and image enhancement using time-shift gathers", SEG Annual Meeting, Houston, Texas, USA, Sep. 22-27, 2013.

Wang et al., "Subsalt velocity update and composite imaging using reverse-time-migration based delayed-imaging-time scan", Geophysics, Nov.-Dec. 2009, pp. WCA159-WCA166, vol. 74, No. 6, Houston, Texas, USA.

Whiteside et al., "Automatic RTM-based DIT scan picking for enhanced salt interpretation", SEG Annual Meeting, San Antonio, Texas, USA, Sep. 18-23, 2011.

Xie et al., "Remove RTM Artifacts Using Delayed Imaging Time Gathers", SEG Annual Meeting, Las Vegas, Nevada, USA, Nov. 4-9, 2012.

Xu et al., "Noise removal by migration of time-shift images", GEOPHYSICS, May-Jun. 2014, pp. S105-S111, vol. 79, No. 3, Houston, Texas, USA.

* cited by examiner

An input time-shift gather and its output at various steps of the method for the North Sea data set. (Left) input (Middle) after the change of variables (Right after applying the inverse phase shift

METHOD APPARATUS AND SYSTEM FOR MIGRATION NOISE ATTENUATION AND IMAGE ENHANCEMENT

CROSS-REFERENCE TO RELATED APPLICATIONS

The present application claims the benefit of priority to U.S. Provisional Application No. 61/818,003, entitled "RTM NOISE ATTENUATION AND IMAGE ENHANCEMENT USING TIME-SHIFT GATHERS," and filed on May 1, 2013. The entire content of the above document is hereby incorporated by reference into the present application.

BACKGROUND

Technical Field

Embodiments of the subject matter disclosed herein relate to methods, apparatuses, and systems for processing seismic data.

Discussion of the Background

Recently, interest in developing new oil and gas production fields has dramatically increased. However, the availability of land based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where or where not to drill (to avoid a dry well).

Marine seismic data acquisition and processing generate a profile (image) of the geophysical structure (subsurface) under the seafloor. While this profile does not provide an accurate location for oil and gas, it suggests, to those trained in the field, the presence or absence of oil and/or gas. Thus, improving the resolution of images of the structures under the seafloor is an ongoing process.

Figure 1:
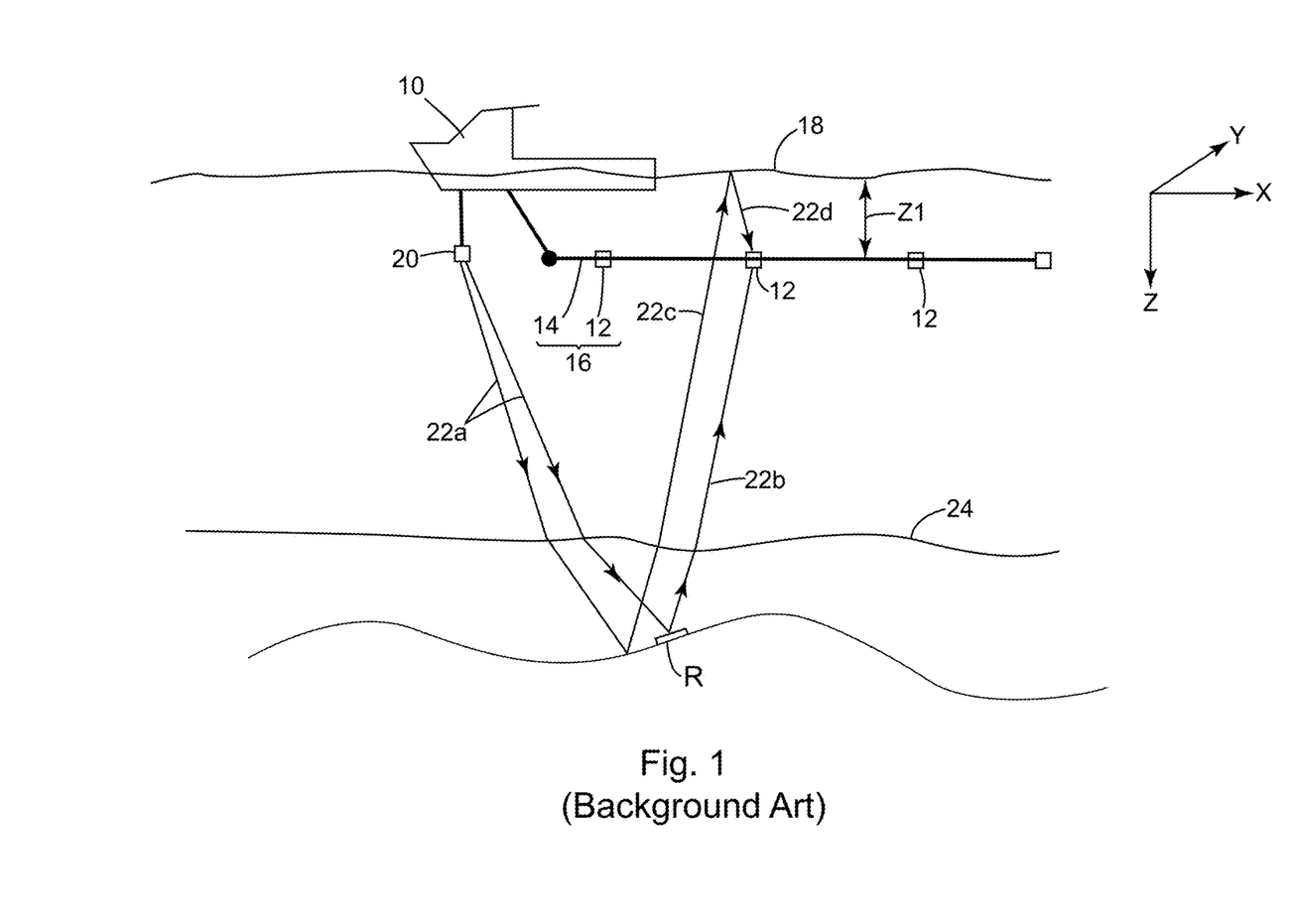
FIG. 1 is a schematic diagram of a conventional marine seismic data acquisition system.

During a seismic gathering process, as shown in FIG. 1, a vessel 10 tows an array of seismic receivers 12 provided on cables 14 that form streamers 16 below a surface 18. The streamers may be disposed horizontally, arranged in a slanted or curved configuration, or be placed at multiple depths. The vessel 10 also tows a sound source assembly 20 that is configured to generate an acoustic wave 22a. The acoustic wave 22a propagates downwards toward the seafloor 24 and penetrates the seafloor until eventually a reflecting structure 26 (e.g., reflector R) reflects the acoustic wave. The reflected acoustic wave 22b propagates upwardly until it is detected by receiver 12 both directly and via a ghost reflection wave 22c. The recorded data is then processed for producing an accurate image of the subsurface. The processing may include various phases, e.g., velocity model determination, pre-stack, migration, post-stack, etc., which are known in the art and thus, their description is omitted herein.

A promising method for seismic data processing is reverse-time migration (RTM). Reverse-time migration uses a two-way wave equation in depth migration and has shown that in complex subsalt and salt flank areas, it is easier to incorporate amplitude corrections than the traditional methods. RTM often correlates the source seismic data wavefield ($D_s$) and the receiver seismic data wavefield ($D_r$) as a function of a time shift value ($\tau$) by correlating forward propagated source seismic data ($D_s(x,t\mp\tau)$) with reverse propagated receiver seismic data ($D_r(x,t\pm\tau)$). The correlation may be conducted for various propagation time shift values ($\tau$) in order to provide time shift correlation data ($I(x,\tau)$) as a function of the time shift ($\tau$) for the selected position (x). In certain embodiments, the correlation is conducted according to the equation:

$$I(x,\tau)=\int D_r(x,t\mp\tau)\cdot D_s(x,t\pm\tau)dt \qquad (1)$$

Figure 2:
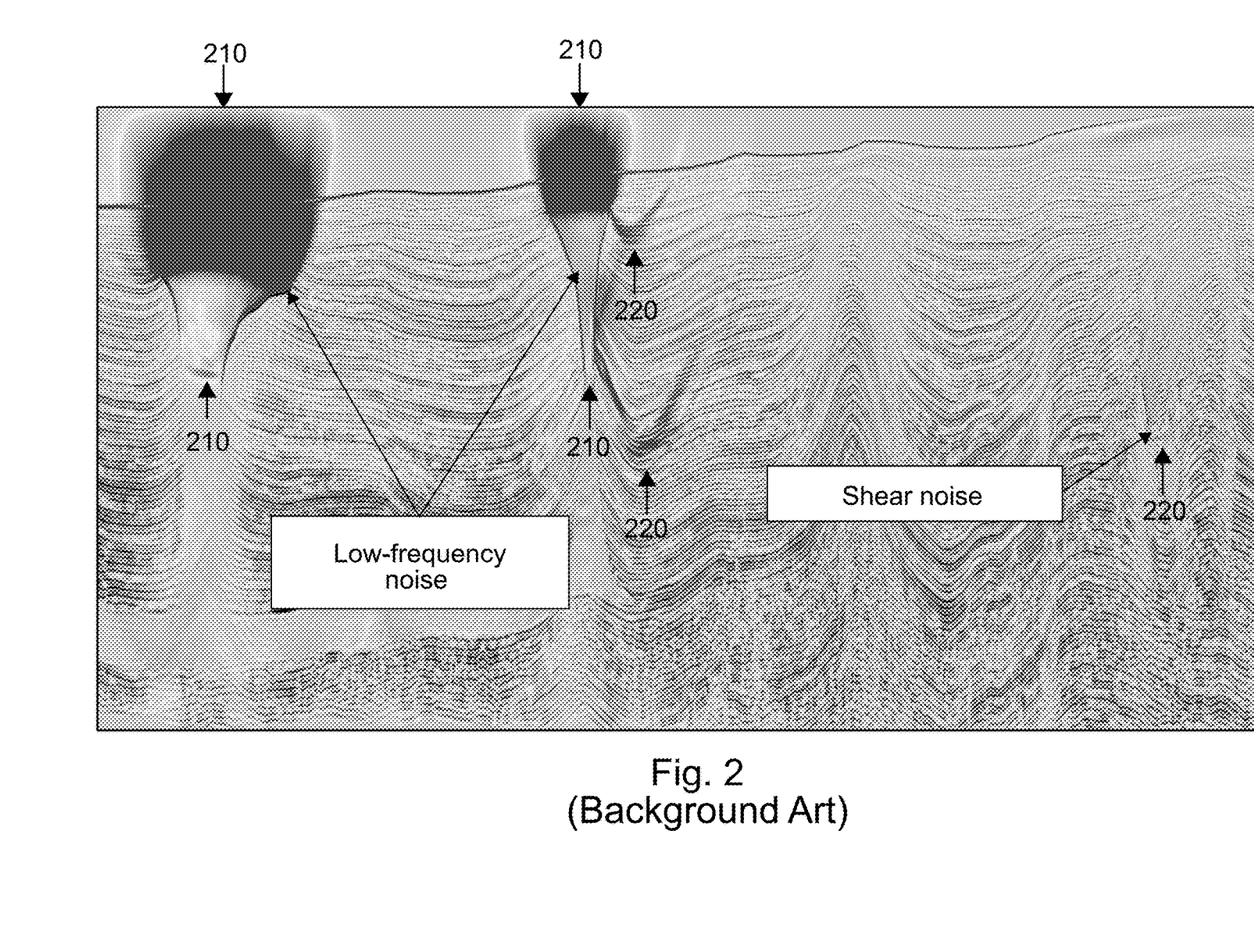
FIG. 2 is an example seismic image having various artifacts associated with current reverse-time migration processing techniques.

A disadvantage of current RTM processing techniques is that various artifacts are generated such as those shown in FIG. 2. For example, low frequency noise may generate one or more low frequency artifacts 210 and shear-like noise may generate one or more shear-like noise artifacts 220.

Given the foregoing, a need exists for improved migration processing, including RTM processing, that substantially eliminates artifacts such as those mentioned above.

SUMMARY

As detailed herein, a method for processing seismic data includes receiving seismic data and a velocity model (c(x)) for a plurality of locations (x), scaling a dimension of the seismic data according to the velocity model (c(x)) to provide velocity normalized seismic data, and generating a final image (S(x)) of the subsurface using the velocity normalized seismic data. The velocity normalized seismic data may be a reverse-time migration image ($I(x,\xi)$) corresponding to the plurality of locations (x) and a plurality of propagation distance offsets ($\xi$). Other imaging methods may also be used instead of RTM, including Kirchoff, beam or one-way wave equation migrations. The method may also include transforming the velocity normalized seismic data for the plurality of selected positions (x) to a wavenumber domain to provide velocity normalized wavenumber data ($I(k,\psi)$) and suppressing data components corresponding to non-physical or undefined reflection angles to provide enhanced wavenumber data ($I'(k,\psi)$) and using the enhanced wavenumber data ($I'(k,\psi)$) to generate the final image (S(x)). An apparatus that incorporates the above method is also disclosed herein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 5a and 5b are image formation methods suitable for use with the artifact suppression method of FIG. 3b or the like;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a two-dimensional (2D) wavefield propagation. However, the embodiments to be discussed next are not limited to 2D wave-fields, but may be also applied to 3D wave-fields.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 3A:
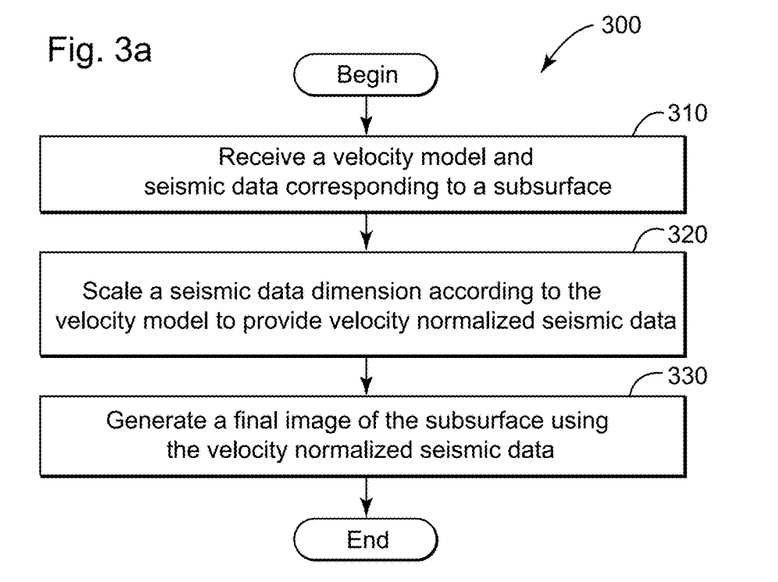
FIG. 3a is flowchart depicting one embodiment of a reverse-time migration processing method that substantially eliminates the artifacts shown in FIG. 2.

FIG. 3a is flowchart depicting one embodiment of a reverse-time migration (RTM) processing method 300 that substantially eliminates the artifacts shown in FIG. 2. As depicted, the RTM processing method 300 includes receiving 310 a velocity model and seismic data corresponding to a subsurface, scaling 320 a dimension of the seismic data, and generating 330 a final image of the subsurface. The RTM processing method 300 results in fewer processing artifacts than traditional RTM processing methods. In addition to RTM processing, the method 300 may be applied to any type of migration such as beam migration, Kirchhoff migration, one way migration, wave equation, or the like.

Receiving 310 may include receiving seismic data corresponding to a set of locations (x) as well as a velocity model (c(x)) for the locations (x). Scaling 320 a dimension of the seismic data may include scaling a particular dimension of the seismic data according to the velocity model (c(x)) to provide velocity normalized seismic data. In some embodiments, the scaled dimension is a time shift dimension ($\tau$) associated with migration and scaling by the velocity model (c(x)) effectively converts the time shift dimension ($\tau$) to a propagation distance offset dimension ($\xi$).

Generating 330 a final image of the subsurface may include using the velocity normalized seismic data to generate the final image of the subsurface. For example, generating 330 a final image of the subsurface may include transforming the velocity normalized seismic data to a processing domain such as a wavenumber domain, and suppressing selected data components corresponding to artifacts within the processing domain. For example, specific data components that correspond to artifacts may be attenuated or zeroed. Generating 330 a final image of the subsurface may also include additional operations necessary or useful to producing the final image.

In some embodiments, the seismic data processed by the method 300 is a reverse-time migration image that includes a time-shift dimension ($\tau$) and a depth dimension (z) that corresponds to the vertical coordinate of the locations (x). The reverse-time migration image may have been generated from seismic data via a correlation operation such as the correlation operation specified in equation (1). In such embodiments, scaling a dimension of the seismic data according to the velocity model (c(x)) (i.e., velocity normalization) may be accomplished with variable substitution according to the equation:

$$\xi(x,\tau)=c(x)\cdot\tau/2 \tag{2}$$

The result of the variable substitution is a velocity normalized reverse-time migration image ($I(x,\xi)$) corresponding to the plurality of locations (x) and a propagation distance offset ($\xi$) instead of the time-shift ($\tau$).

In other embodiments, the seismic data processed by the method 300 is a pre-migration seismic data for which a time shift dimension ($\tau$) is scaled previous to, or in conjunction with, conducting a migration algorithm. In some embodiments, scaling a dimension of the seismic data may be accomplished in conjunction with a correlation operation of a migration algorithm in order to avoid storing one or more intermediate (stretched) images. For example, a velocity normalized reverse-time migration image ($I(x,\xi)$) may be generated by directly correlating forward propagated source seismic data ($D_s$) with backward propagated receiver seismic data ($D_r$) as a function of propagation distance offset ($\xi$) [via pre-correlation scaling of the time shift dimension ($\tau$)] rather than post-correlation scaling of the time shift dimension ($\tau$) of the image. In some embodiments, direct correlation of the seismic data as a function of the propagation distance offset ($\xi$) is accomplished by solving for a velocity normalized time offset ($\xi_{norm}$) using equation (2) resulting in:

$$\tau_{norm}=2\xi/c(x) \tag{3}$$

The velocity normalized (i.e., stretched) time offset ($\tau_{norm}$) may then be used to directly correlate forward propagated source seismic data ($D_s(x,t\mp\tau_{norm})$) with reverse propagated receiver seismic data ($D_r(x,t\pm\tau_{norm})$) for various propagation distance offsets ($\xi$) to provide the velocity normalized seismic data (alternately referred to herein as the offset distance correlation data) ($I(x,\xi)$) according to the equation:

$$I(x,\xi)=\int D_r(x,t\pm\tau_{norm})\cdot D_s(x,t\mp\tau_{norm})dt \tag{4}$$

Figure 3B:
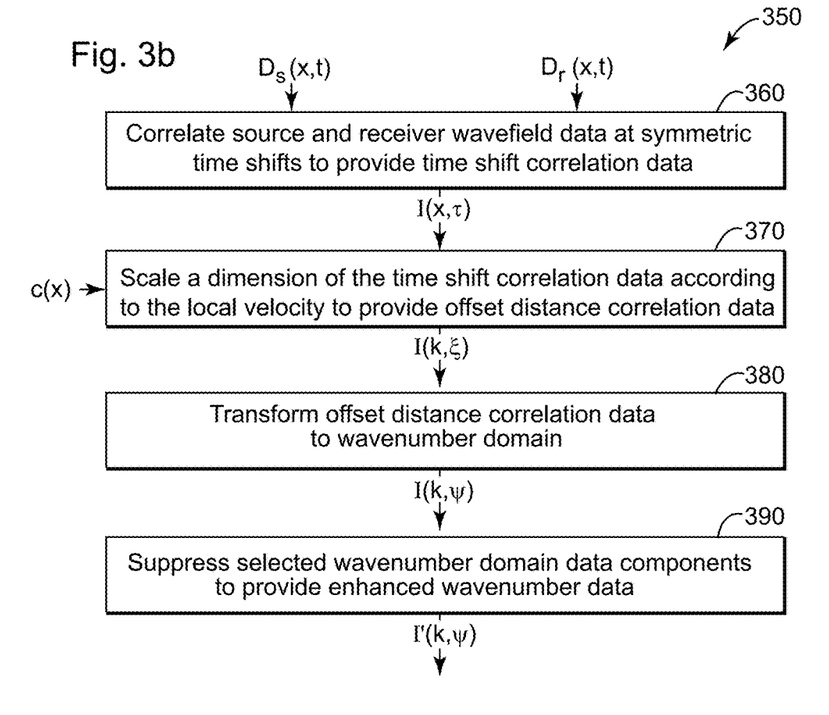
FIG. 3b is a dataflow diagram depicting one embodiment of an artifact suppression method.

FIG. 3b is a dataflow diagram depicting one embodiment of an artifact suppression method 350. As depicted, the artifact suppression method 350 includes correlating 360, scaling a dimension 370, transforming 380, and suppressing 390. The artifact suppression method 350 provides additional details for one embodiment of the RTM processing method 300. In the depicted embodiment, the correlation operation 360 and the dimension scaling operation 370 in FIG. 3b correspond to dimension scaling step 320 in FIG. 3a, while the transforming operation 380 and the suppressing operation 390 in FIG. 3b correspond to the generating step 330 in FIG. 3a.

Correlating 360 may include correlating the source seismic data ($D_s$) and receiver seismic data ($D_r$) according to equation (1) to provide the time shift correlation data ($I(x,\tau)$). Scaling a dimension 370 may include scaling a dimension of the time shift correlation data ($I(x,\tau)$) by scaling the time shift dimension ($\tau$) according to an estimated local velocity (c(x)) resulting in the offset distance correlation data ($I(x,\xi)$). In certain embodiments, scaling the time shift dimension ($\tau$) according to the local velocity (c(x)) is conducted according to equation (2).

Transforming 380 may include transforming the offset distance correlation data ($I(x,\xi)$) to a wavenumber domain to provide velocity normalized wavenumber data ($I(k,\psi)$). Each spatial dimension (x) and offset dimension ($\xi$) may be involved in the transform. Suppressing 390 may include suppressing wavenumber domain components that correspond to non-physical, undefined, or unwanted propagation (i.e., reflection and refraction) angles to provide enhanced wavenumber data (I'(k,ψ)).

Figure 4A:
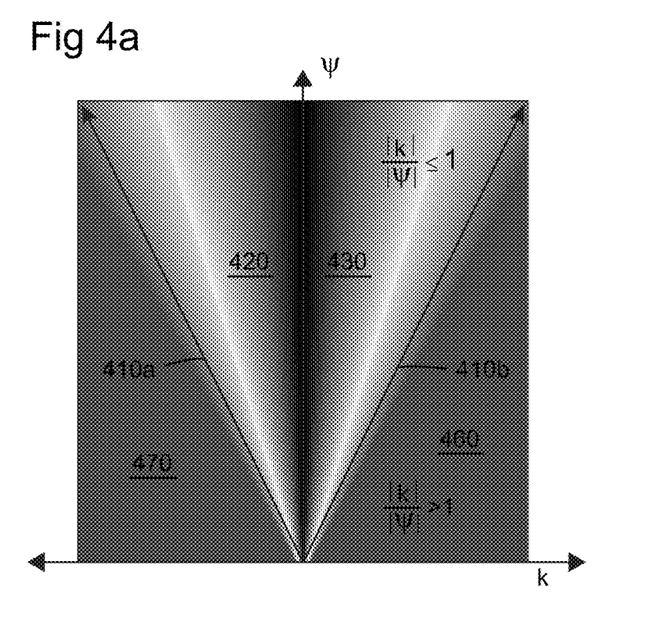
FIGS. 4a and 4b are graphs depicting the relationship between velocity normalized wavenumber domain components and physical, non-physical, and undefined reflection angles.
Figure 4B:
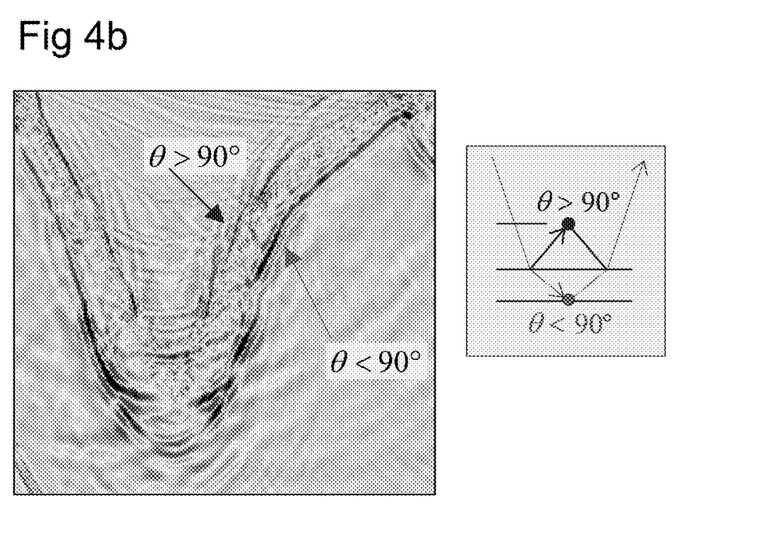

FIGS. 4a and 4b are a respective graph and seismic image depicting the relationship between velocity normalized wavenumber domain components (I(k,ψ)) and various propagation angles including physical, non-physical, and undefined propagation angles. In the depicted graph of FIG. 4a, k is the wavenumber value of a component and ψ is the Fourier transform variable corresponding to the offset distance ξ. Thus the coordinates k and ψ of the velocity normalized wavenumber data (I(k,ψ)) are represented as the respective x and y coordinates of FIG. 4a. Consequently, FIGS. 4a and 4b communicate how the artifact suppression operation 390, or the like, can be used to reduce or eliminate components of the velocity normalized wavenumber data (I(k,ψ)) that correspond to artifacts and provide enhanced the wavenumber data (I'(k,ψ)).

As is well understood by one of skill in the art, a seismic wave propagates through a medium and may change directions as well as velocity at a boundary or transition in the properties of the medium. In some cases the wave may be normal to the boundary or transition and a portion of the wave may be reflected straight back resulting in a change of direction of 180 degrees represented by the line 410a while the majority of energy of the wave may proceed straight forward with no change in direction (i.e., 0 degrees) represented by the line 410b. In most situations, however, the wave is not exactly normal to the boundary or transition and a portion of the wave will be reflected with a propagation angle (θ) of greater than 90 degrees and less than 180 degrees as shown by ray 440 in FIG. 4b. Reflected propagation angles correspond to region 420 in FIG. 4a. A portion of wave will also be refracted with a propagation angle (θ) of greater than 0 degrees and less than 90 degrees as shown by ray 450 in FIG. 4b. Refracted propagation angles correspond to region 430 in FIG. 4a.

Given that the propagating seismic wave has some forward momentum (k), a propagation angle of 90 degrees represents a non-physical event with no forward or backward momentum. Consequently, any wavenumber domain components (I(k,ψ)) with zero momentum (i.e., k=0) and non-zero magnitude can be attenuated or zeroed out without a loss of data fidelity.

Applicants have also observed that regions 460 and 470 (where |k|>|ψ|) correspond to shear-like noise artifacts such as the shear-like noise artifacts 220 shown in FIG. 2. Consequently, attenuating or zeroing out any wavenumber domain components corresponding to regions 460 and 470 that have non-zero magnitude can substantially eliminate such artifacts.

Figure 5A:
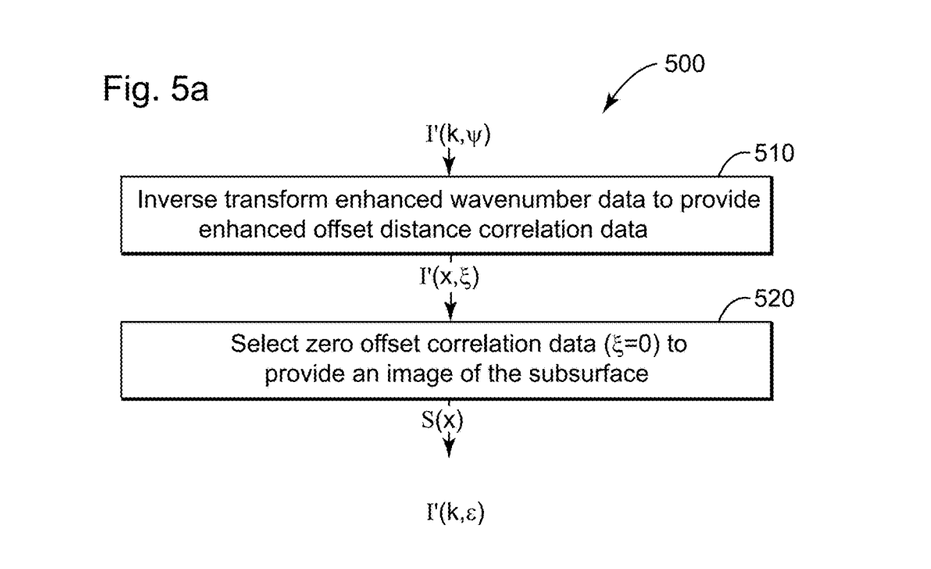
Figure 5B:
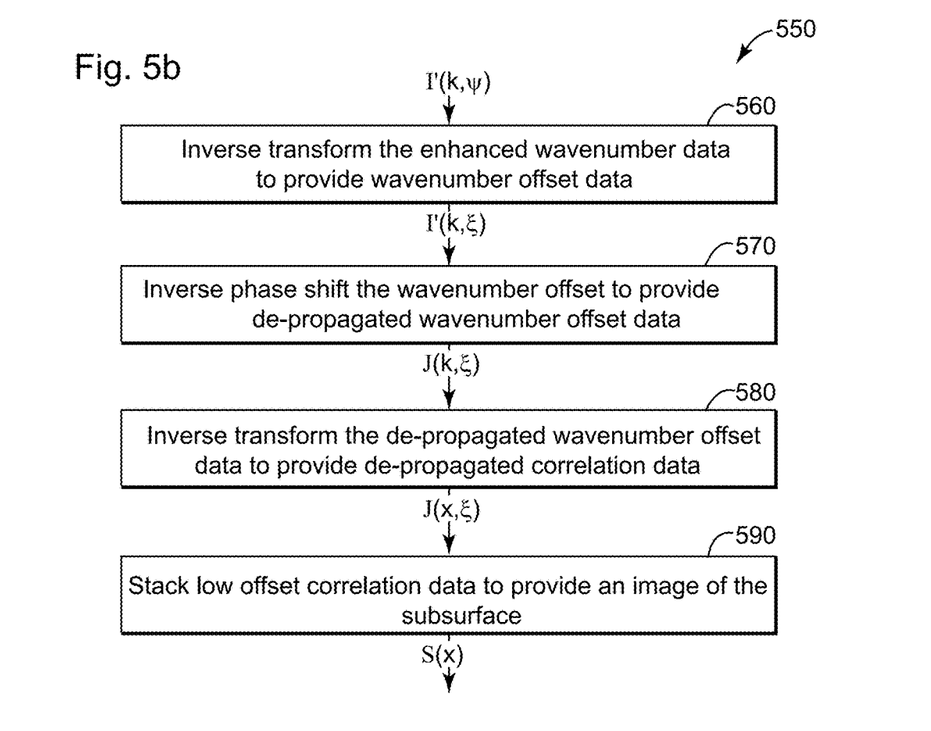

FIGS. 5a and 5b are respective image formation methods 500 and 550 suitable for use with the artifact suppression method 350 of FIG. 3b or the like. As depicted, the image formation method 500 includes inverse transforming 510 enhanced wavenumber data and selecting 520 zero offset correlation data. The image formation method 500 may be used to process seismic data that when an accurate velocity model is available for the subsurface. The methods 500 and 550 are two examples of image formation methods that may be used to leverage the results of the artifact suppression method 350. One of skill in the art will appreciate that other image formation methods may be used that leverage the results of the artifact suppression methods disclosed herein, or the like. Alternative artifact suppression methods may involve processing in the SVD domain, rank reduction domain, curvelet domain, Radon domain or another model domain. Alternatively filtering methods may be used, for example fx prediction filtering, fx projection filtering, averaging filters, median filters, etc. Filters may be designed to have a similar effect to the processing in the FK domain described herein.

Inverse transforming 510 enhanced wavenumber data may include conducting an inverse FFT algorithm that operates on each dimension of the enhanced wavenumber data (I'(k,ψ)) resulting in the enhanced offset distance correlation data (I'(x,ξ)).

Selecting 520 zero offset correlation data may include selecting the components of the enhanced offset distance correlation data (I'(x,ξ)) where the offset distance (ξ) is equal to zero, namely S(x)=I(x,ξ=0), where (x) is the selected location and (S(x)) is the image value at the selected location. By selecting a number of locations (x), a complete image may be constructed.

In contrast to the image formation method 500, the image formation method 550 includes inverse transforming 560, inverse phase shifting 570, inverse transforming 580, and stacking 590. The image formation method 550 may be used to process seismic data when an accurate velocity model is not available for the subsurface.

Inverse transforming 560 may include conducting an inverse transform algorithm such as an inverse FFT on the enhanced wavenumber data (I'(k,ψ)) only for the offset dimension(s) (ξ) to provide wavenumber offset data (I'(k,ξ)).

Inverse phase shifting 570 may include inverse phase shifting the wavenumber offset data (I'(k,ξ)) to provide de-propagated wavenumber offset data (J(k,ξ)). In one embodiment, the inverse phase shifting is conducted according to the equation:

$$J(k,\xi) = I'(k,\xi) \cdot e^{-i\xi k} \quad (5)$$

Inverse transforming 580 may include conducting an inverse transform algorithm such as an inverse FFT on the de-propagated wavenumber offset data (J(k,ξ)) only for the spatial dimension(s) (x) to provide de-propagated correlation data (J(x,ξ)) as a function of the location (x) and the propagation distance offset (ξ).

Stacking 590 may include summing a subset of the offset data for the plurality of selected positions (x) to provide an image of the subsurface. In one embodiment, low offset data are selected (i.e., where ξ≈0) and the stacking is conducted consistent with the equation:

$$S(x) = \int J(x,\xi \approx 0) d\xi \quad (6)$$

Figure 6:
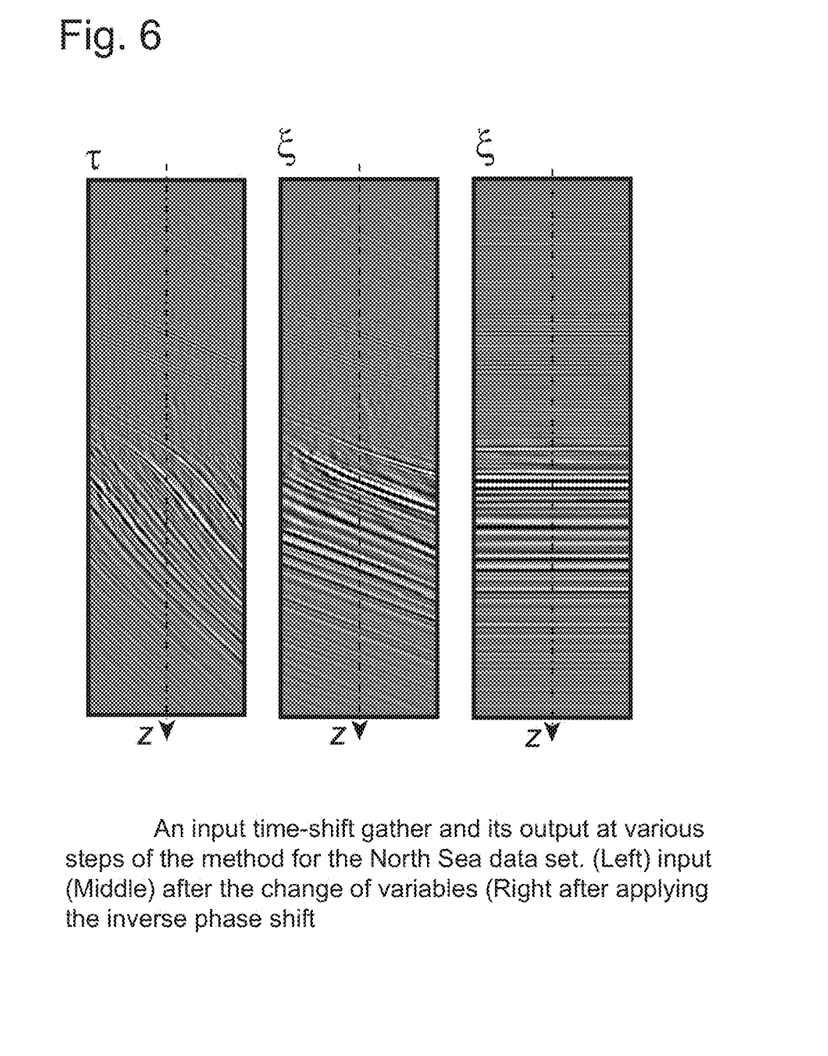
FIG. 6 is a set of seismic data images depicting the effect of velocity normalization on seismic data stackability.

FIG. 6 is a set of seismic data images depicting the effect of velocity normalization and inverse phase shifting on seismic data stackability. As shown in the left image of FIG. 6, changes in the velocity of the medium result in a warping of the seismic data image as a function of the time shift value (τ). Consequently, a conventional slant stacking operation will produce noise artifacts. However, dimension scaling according to a local velocity (i.e., velocity normalization) as taught herein results in seismic data as a function of the propagation distance offset (ξ) resulting in a seismic data image with substantially reduced warping, as shown in the middle image of FIG. 6. Furthermore, by conducting an inverse phase shifting operation the seismic data becomes stackable as shown in the right image of FIG. 6. Consequently, the processing methods taught herein can be used to generate seismic images that have fewer artifacts and higher fidelity than conventional methods. Additional information regarding the embodiments disclosed herein is disclosed in "RTM noise attenuation and image enhancement using time-shift gathers" authored by Khalil, A., Sun, J., Zhang, Y., and Poole, G. and published in the SEG Technical Program Expanded Abstracts 2013: pp. 3789-3793 which is incorporated herein by reference.

Figure 7A:
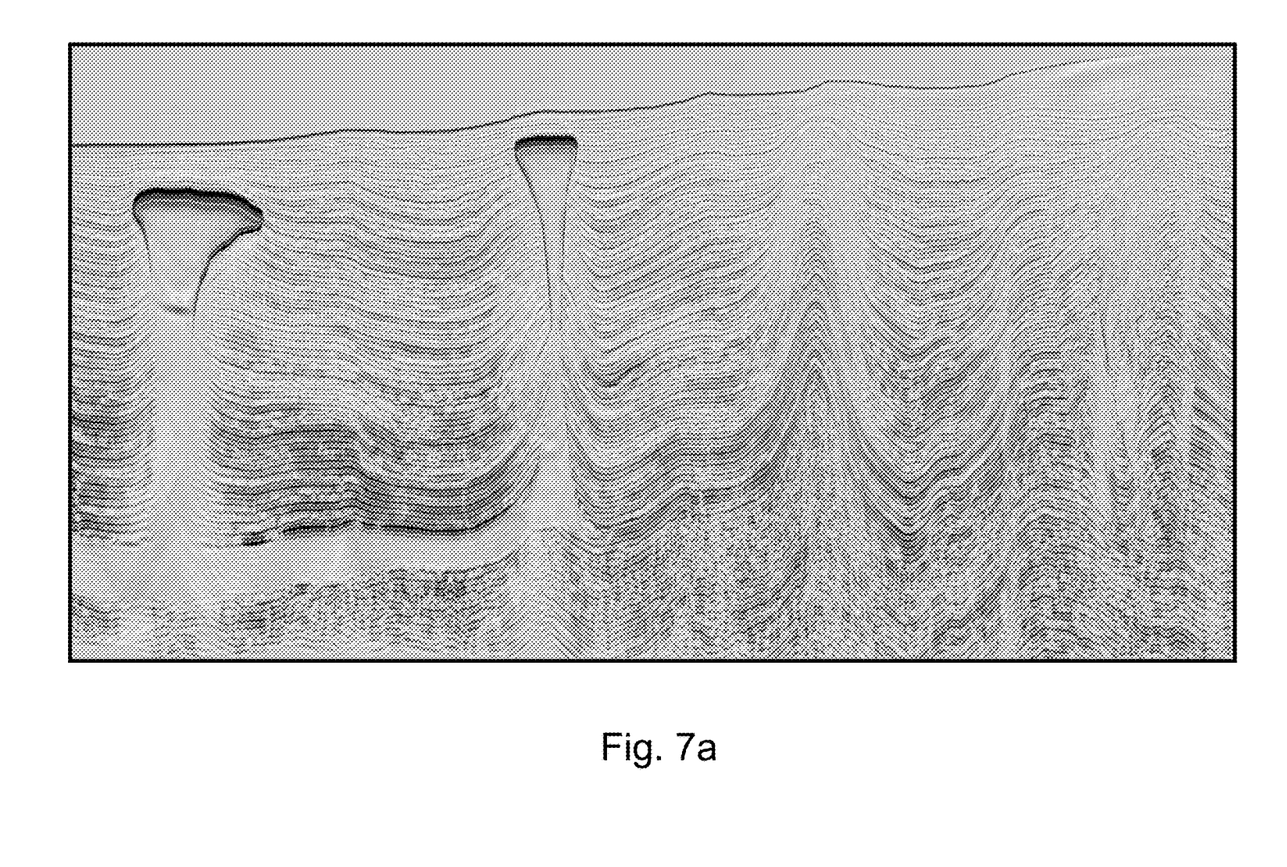
FIGS. 7a and 7b are example seismic images that show the effect of artifact suppression on reverse-time migration seismic data processing.
Figure 7B:
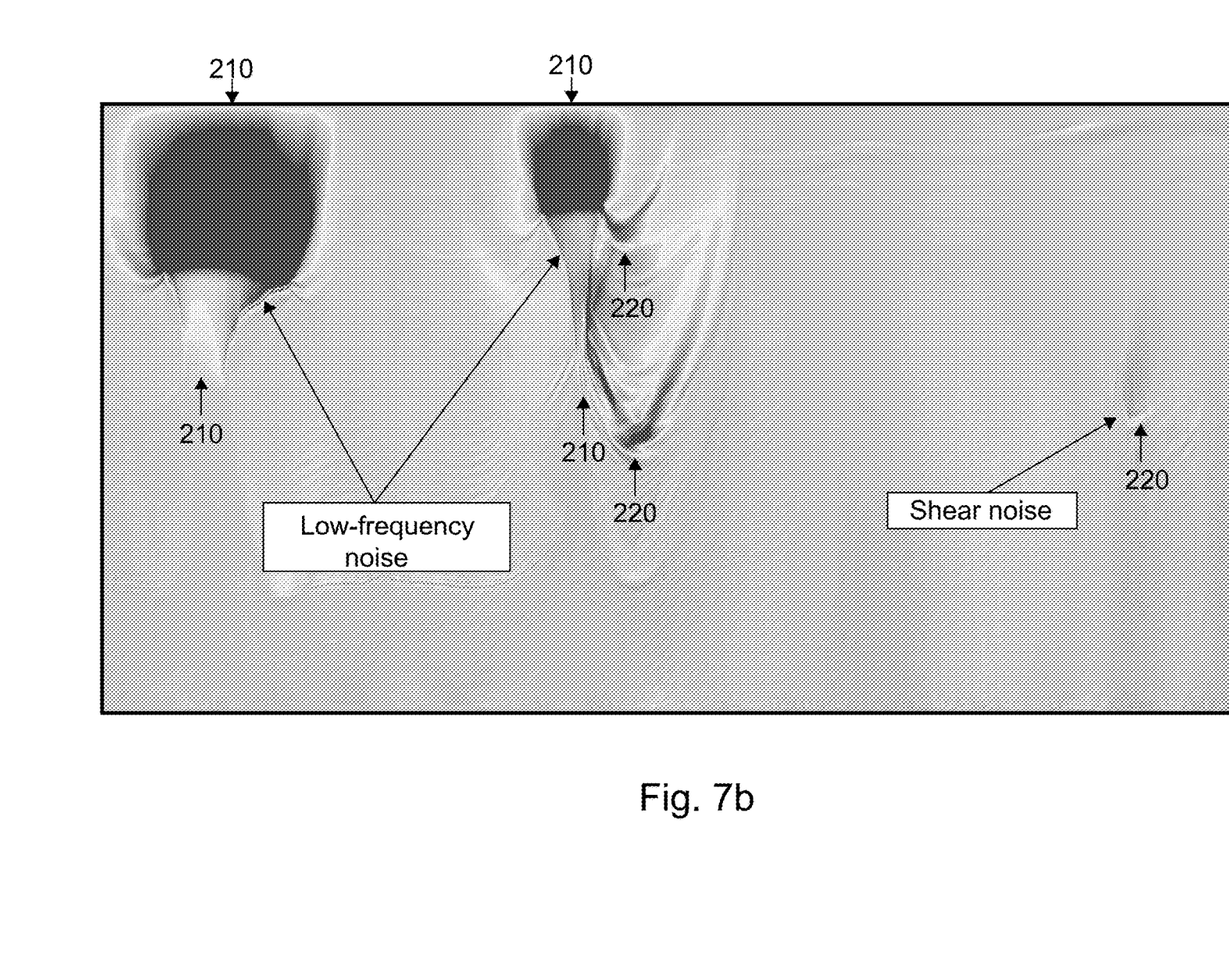

FIGS. 7a and 7b are example seismic images that show the effect of the artifact suppression methods taught herein on reverse-time migration seismic data processing. As shown in FIG. 7a, artifact suppression produces a seismic image of higher fidelity than the traditional methods used to generate FIG. 2. FIG. 7b shows the actual differences between FIG. 7a and FIG. 2. Specifically, FIG. 7b shows that two large artifacts 210 corresponding to low frequency noise and several artifacts 220 corresponding to shear noise are substantially absent from FIG. 7a.

Figure 8:
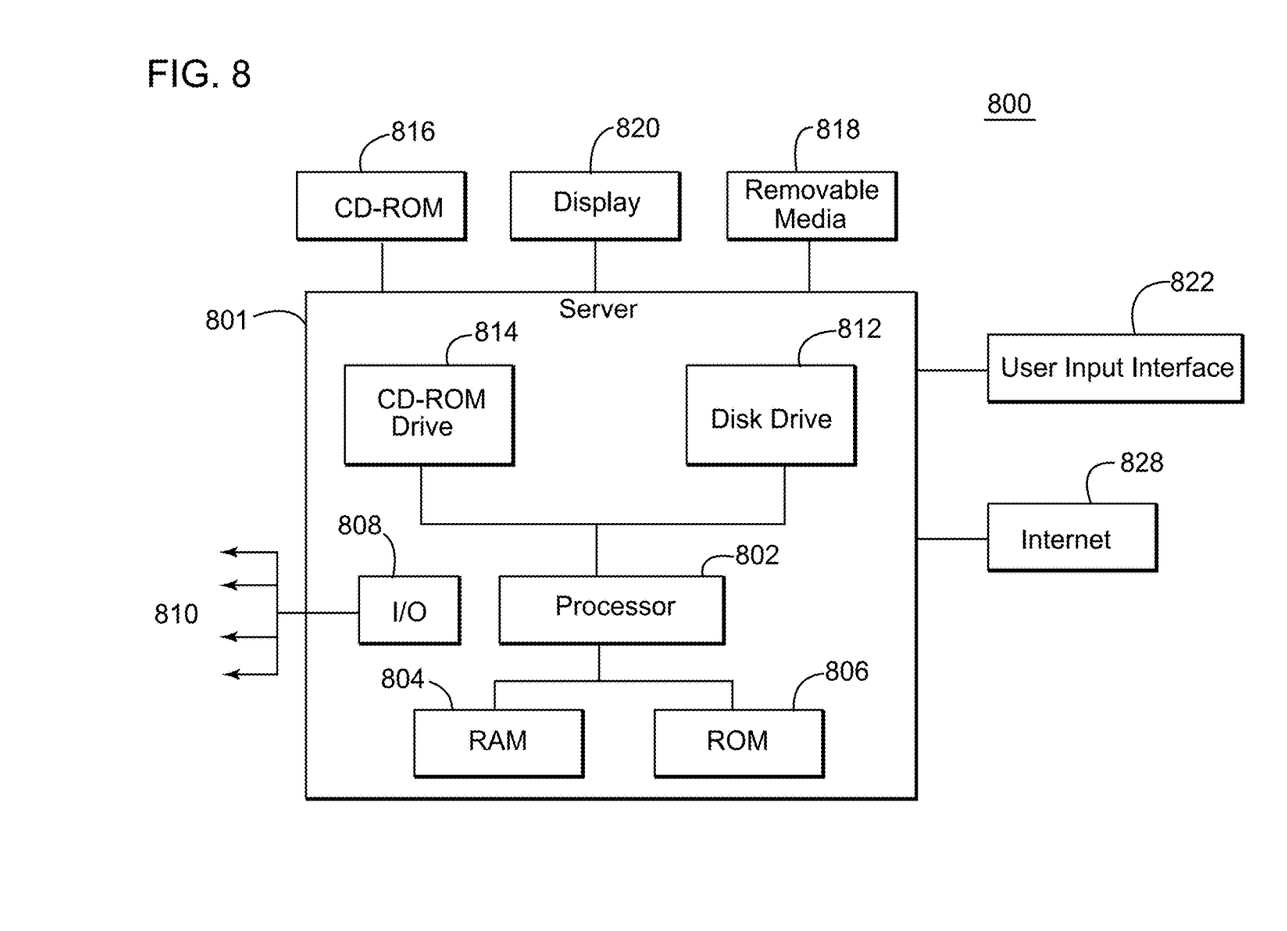
FIG. 8 is a schematic diagram of a computing device suitable for implementing various embodiments disclosed herein.

The above-discussed procedures and methods provide improved results over existing migration processing techniques and may be implemented in a computing device illustrated in FIG. 8. Hardware, firmware, software, or a combination thereof may be used to perform the various steps and operations described herein. The computing device 800 of FIG. 8 is an exemplary computing structure that may be used in connection with such a system. One of skill in the art will appreciate that the presented examples are representative and that various adjustments to the presented methods and apparatus may be made that fit within the scope of the following claims.

The exemplary computing device 800 suitable for performing the activities described in the exemplary embodiments may include a server 801. Such a server 801 may include a central processor (CPU) 802 coupled to a random access memory (RAM) 804 and to a read only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions known in the art, as dictated by software and/or firmware instructions.

The server 801 may also include one or more data storage devices, including hard drives 812, CDROM drives 814, and other hardware capable of reading and/or storing information such as DVD, etc. In one embodiment, software for carrying out the above-discussed steps may be stored and distributed on a CDROM or DVD 816, a USB storage device 818 or other form of media capable of portably storing information. These storage media may be inserted into, and read by, devices such as the CDDROM drive 814, the disk drive 812, etc. The server 801 may be coupled to a display 820, which may be any type of known display or presentation screen, such as LCD displays, plasma display, cathode ray tubes (CRT), etc. A user input interface 822 is provided, including one or more user interface mechanisms such as a mouse, keyboard, microphone, touchpad, touch screen, voice-recognition system, etc.

The server 801 may be coupled to other devices, such as sources, detectors, etc. The server may be part of a larger network configuration as in a global area network (GAN) such as the Internet 828, which allows ultimate connection to the various landline and/or mobile computing devices.

The disclosed exemplary embodiments provide a computing device, a method for seismic data processing, and systems corresponding thereto. For example, the disclosed computing device and method could be integrated into a variety of seismic survey and processing systems including land, marine, ocean bottom, and transitional zone systems with either cabled or autonomous data acquisition nodes. It should be understood that this description is not intended to limit the invention. On the contrary, the exemplary embodiments are intended to cover alternatives, modifications, and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing seismic data corresponding to a subsurface, the method comprising:
receiving seismic image data corresponding to a plurality of locations (x);
receiving a velocity model (c(x)) for the plurality of locations (x);
scaling with a computing device a time-shift dimension ($\tau$) associated with the seismic image data according to the velocity model (c(x)) to provide velocity normalized seismic data; and
generating a final image (S(x)) of the subsurface using the velocity normalized seismic data,
wherein the step of scaling converts the time-shift dimension ($\tau$) to a propagation distance offset ($\xi$) based on the velocity model (c(x)).

2. The method of claim 1, wherein the seismic image data corresponds to a reverse time migration, beam migration, Kirchhoff migration, one way migration, wave equation, or other migration.

3. The method of claim 1, wherein the seismic image data is in a time or depth domain.

4. The method of claim 1, wherein the velocity normalized seismic data is a migration image (I(x,$\xi$)) obtained by correlation and corresponding to the plurality of locations (x) and a plurality of propagation distance offsets ($\xi$).

5. The method of claim 4, wherein the migration image (I(x,$\xi$)) is generated by post-correlation scaling of the time-shift dimension ($\tau$) according to the velocity model (c(x)).

6. The method of claim 4, wherein the migration image (I(x,$\xi$)) is generated by pre-correlation scaling of the time-shift dimension ($\tau$) according to the velocity model (c(x)).

7. The method of claim 4, wherein generating the final image (S(x)) of the subsurface comprises transforming the migration image (I(x,$\xi$)) for the plurality of selected positions (x) to a wavenumber domain to provide velocity normalized wavenumber data (I(k,$\psi$)) and suppressing data components corresponding to non-physical or undefined reflection angles to provide enhanced wavenumber data (I'(k,$\psi$)).

8. The method of claim 7, comprising inverse transforming the enhanced wavenumber data (I'(k,ψ)) to provide enhanced offset distance correlation data (I'(x,ξ)).

9. The method of claim 8, comprising selecting zero offset data for the offset distance correlation data (I'(x,ξ)).

10. The method of claim 7, comprising inverse transforming the enhanced wavenumber data (I'(k,ψ)) to provide wavenumber offset data (I'(k,ξ)) and inverse phase shifting the wavenumber offset data (I'(k,ξ)) to provide de-propagated wavenumber data (J(k,ξ)).

11. The method of claim 10, comprising inverse transforming the de-propagated wavenumber data (J(k,ξ)) to provide de-propagated correlation data (J(x,ξ)).

12. The method of claim 11, comprising stacking a subset of de-propagated correlation data (J(x,ξ)) for the plurality of locations (x).

13. A computing device configured to process seismic data corresponding to a subsurface, the computing device comprising:
an interface configured to receive seismic image data corresponding to a plurality of locations (x);
a processor configured to scale a time-shift dimension (τ) associated with the seismic image data, or an image derived therefrom, according to a velocity model (c(x)) to provide velocity normalized seismic data; and
the processor configured to generate a final image (S(x)) of the subsurface using the velocity normalized seismic data,
wherein the processor scales the time-shift dimension (τ) by converting the time-shift dimension (τ) to a propagation distance offset (ξ) based on the velocity model (c(x)).

14. The apparatus of claim 13, wherein the seismic image data corresponds to a reverse time migration, beam migration, Kirchhoff migration, one way migration, or wave equation.

15. The apparatus of claim 13, wherein the seismic image data is in a time or depth domain.

16. The apparatus of claim 13, wherein the velocity normalized seismic data is a reverse-time migration image (I(x,ξ)) corresponding to the plurality of locations (x) and a plurality of propagation distance offsets (ξ).

17. The apparatus of claim 16, wherein the processor is configured to generate the final image (S(x)) of the subsurface by transforming the reverse-time migration image (I(x,ξ)) for a plurality of selected positions (x) to a wavenumber domain to provide velocity normalized wavenumber data (I(k,ψ)) and suppressing data components corresponding to non-physical or undefined reflection angles to provide enhanced wavenumber data (I'(k,ψ)).

18. The apparatus of claim 17, wherein the processor is configured to inverse transform the enhanced wavenumber data (I'(k,ψ)) to provide wavenumber offset data (I'(k,ξ)) and inverse phase shift the wavenumber offset data (I'(k,ξ)) to provide de-propagated wavenumber data (J(k,ξ)).

19. The apparatus of claim 18, wherein the processor is configured to inverse transform the de-propagated wavenumber data (J(k,ξ)) to provide de-propagated correlation data (J(x,ξ)).

20. A method for processing seismic data corresponding to a subsurface, the method comprising:
correlating a forward propagated source wavefield ($D_s$) corresponding to a seismic source with a backward propagated receiver wavefield ($D_r$) corresponding to a seismic receiver as a function of a time shift (τ) to provide time shift correlation data (I(x,τ)) for a selected position (x);
repeating the correlating operation for a plurality of selected positions (x) to provide time shift correlation data (I(x,τ)) for the plurality of selected positions (x);
scaling with a computing system the time shift (τ) of the time shift correlation data (I(x,τ)) according to a velocity mapping function to provide offset distance correlation data (I(x,ξ));
transforming the offset distance correlation data (I(x,ξ)) for the plurality of selected positions (x) to a wavenumber domain to provide velocity normalized wavenumber data (I(k,ψ)) and suppressing data components corresponding to non-physical or undefined reflection angles to provide enhanced wavenumber data (I'(k,ψ)); and
generating a final image (S(x)) of the subsurface using the enhanced wavenumber data (I'(k,ψ)),
wherein the step of scaling converts the time shift (τ) to a propagation distance offset (ξ) according to the velocity mapping function.

* * * * *